(12) United States Patent
Stringham

(10) Patent No.: US 10,269,150 B1
(45) Date of Patent: Apr. 23, 2019

(54) CURVE EDITING BASED ON INFERRED CONTROL POINTS

(71) Applicant: LUCID SOFTWARE, INC., South Jordan, UT (US)

(72) Inventor: Ryan James Stringham, Herriman, UT (US)

(73) Assignee: LUCID SOFTWARE, INC., South Jordan, UT (US)

( * ) Notice: Subject to any disclaimer, the term of this patent is extended or adjusted under 35 U.S.C. 154(b) by 118 days.

(21) Appl. No.: 15/211,941

(22) Filed: Jul. 15, 2016

(51) Int. Cl.
*G06T 11/20* (2006.01)
*G06F 3/0484* (2013.01)

(52) U.S. Cl.
CPC ........ *G06T 11/203* (2013.01); *G06F 3/04845* (2013.01); *G06T 11/206* (2013.01); *G06T 2207/20092* (2013.01)

(58) Field of Classification Search
None
See application file for complete search history.

(56) References Cited

U.S. PATENT DOCUMENTS

| 9,224,219 | B2 | 12/2015 | Mayot | |
|---|---|---|---|---|
| 9,293,117 | B2 | 3/2016 | Dilts | |
| 2014/0098142 | A1* | 4/2014 | Lee | G06F 3/04845 345/676 |

FOREIGN PATENT DOCUMENTS

WO    93/07572 A1    4/1993

OTHER PUBLICATIONS

International Search Report dated Sep. 27, 2017 as received in Application No. PCT/US2017/042444.
Written Opinion of the International Searching Authority dated Sep. 27, 2017 as received in Application No. PCT/US2017/042444.

\* cited by examiner

*Primary Examiner* — YuJang Tswei
(74) *Attorney, Agent, or Firm* — Maschoff Brennan

(57) ABSTRACT

A method to generate a curved connector includes receiving input effective to designate multiple designated points of the curved connector. The designated points include initial and final endpoints and one or more intermediate points between the initial and final endpoints. The method may also include inferring, for each intermediate point, first and second control points without receiving input effective to directly specify the first control point or the second control point. The method may also include calculating: a first curve to include in the curved connector between a corresponding one of the one or more intermediate points and a preceding one of the designated points based at least on the first control point; and a second curve to include in the curved connector between the corresponding one of the one or more intermediate points and a subsequent one of the designated points based at least on the second control point.

20 Claims, 7 Drawing Sheets ved connector and the designated points of FIG. 4B
CURVE EDITING BASED ON INFERRED CONTROL POINTS

FIELD

Some embodiments described herein generally relate to curve editing based on inferred control points.

BACKGROUND

Unless otherwise indicated herein, the materials described herein are not prior art to the claims in the present application and are not admitted to be prior art by inclusion in this section.

Some diagram applications allow users to generate charts and diagrams on a computer, e.g., flowchart diagrams, organizational charts, and/or network diagrams. In such charts and/or diagrams, objects may be interconnected by connectors. Example connectors include straight line connectors, elbow connectors, and curved connectors.

Each curved connector in some diagram applications is generated as one or more Bézier curves that in combination form the curved connector. Each of the Bézier curves that make up the curved connector includes two points at which the curved connector starts or stops or through which the curved connector passes. Each of the Bézier curves may additionally include one control point (for a quadratic Bézier curve), two control points (for a cubic Bézier curve), or more control points (for fourth or higher order Bézier curves) that determine the shape of a given one of the Bézier curves.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a method to generate a curved connector that passes through multiple designated points in a diagram includes receiving input effective to designate the designated points of the curved connector. The designated points may include an initial endpoint, a final endpoint, and one or more intermediate points between the initial endpoint and the final endpoint. The method may also include inferring, for each of the one or more intermediate points, a first control point and a second control point without receiving input effective to directly specify the first control point or the second control point. The method may also include calculating a first curve to include in the curved connector between a corresponding one of the one or more intermediate points and a preceding one of the designated points based at least on the first control point. The method may also include calculating a second curve to include in the curved connector between the corresponding one of the one or more intermediate points and a subsequent one of the designated points based at least on the second control point.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which.

DETAILED DESCRIPTION OF SOME EXAMPLE EMBODIMENTS

Some embodiments described herein generally relate to curve editing based on inferred control points. In some embodiments, control points may be inferred to generate curved connectors that have intended or desired shapes without a user manually adjusting locations and/or directions of one or more control points or otherwise directly specifying the one or more control points. Instead of requiring the user to manually adjust locations and/or directions of the one or more control points after changing the location of a designated point through which the curved connector passes or at which the curved connector starts or stops, the user may simply change the location of the designated point. After the location of the designated point is changed, location and/or direction of one or more control points may be inferred to generate the curved connector with a shape that may match or at least be closer to an intended shape than would otherwise result from only changing the location of the designated point without also manually adjusting the location and/or distance of one or more control points.

Figure 1A:
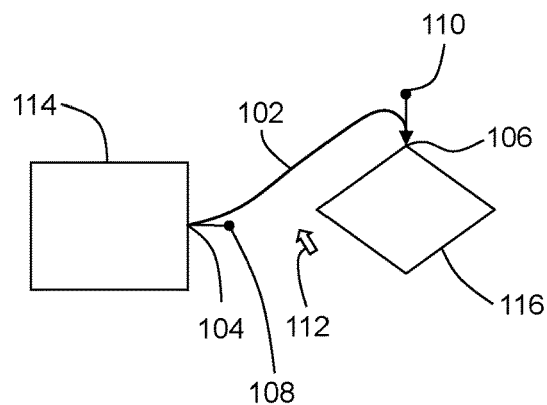
FIGS. 1A and 1B illustrate a curved connector made up of one or more cubic Bézier curves.
Figure 1B:
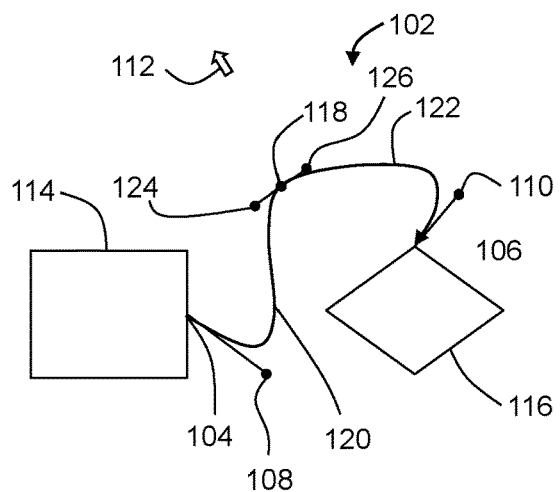

FIGS. 1A and 1B illustrate a curved connector 102 made up of one or more cubic Bézier curves. The curved connector 102 includes two endpoints 104 and 106 at which the curved connector 102 starts and stops and that are part of the curved connector 102. The two endpoints 104 and 106 may be designated, e.g., by a user, as designated points that are part of the curved connector 102 and through which the curved connector 102 passes or starts or stops. The two endpoints 104 and/or any other designated points of the curved connector 102 are sometimes referred to as control points, e.g., when the curved connector 102 is generated as one or a combination of multiple Bézier curves. In the example of FIG. 1A, the curved connector 102 includes a single cubic Bézier curve that connects the endpoint 104 and the endpoint 106 together.

FIG. 1A also illustrates two control points 108 and 110 that may be displayed in some diagram applications when a user edits the curved connector 102 and that may determine a shape of the curved connector 102 (or at least a portion thereof). The control points 108 and 110 may be invisible (e.g., obscured or not displayed) when the user is not editing the curved connector 102.

To avoid confusion between terms, the term "control point" will be used hereafter to refer exclusively to control points that determine a shape of a curved connector without being a part of the curved connector, such as the control points 108 and 110, whereas the term "designated point" will be used to refer to points that have been designated to make up part of the curved connector (e.g., endpoints or intermediate points through which the curved connector is designated to pass through), such as the two endpoints 104 and 106 in FIG. 1A. In the example of FIG. 1A, the two endpoints 104 and 106 and the two control points 108 and 110 determine the shape of the single Bézier curve that makes up the curved connector 102.

As illustrated, each control point 108 and 110 is connected to a corresponding one of the endpoints 104 and 106 by a control point line. Similar to the control points 108 and 110, the control point lines may be visible when the user edits the curved connector 102 but may be invisible (e.g., obscured or not displayed) when the user is not editing the curved connector. Each control point line is a straight line that connects the control point 108 or 110 to the end point 104 or 106. A direction of each control point line relative to the corresponding endpoint 104 or 106 (or relative to some other reference frame) is a direction of the corresponding control point 108 or 110. In the example of FIG. 1A, the direction of the control point 108 is rightward from the endpoint 104 and the direction of the control point 110 is upward from the endpoint 106.

To edit the shape of the curved connector 102, the user may adjust a distance of the control point 108 or 110 relative to the endpoint 104 or 106 and/or a direction of the control point 108 or 110 relative to the endpoint 104 or 106. For instance, the user may "grab" (e.g., using a mouse click or other appropriate input) the control point 108 or 110 and drag it around before releasing it at a new location to adjust its distance and/or direction relative to the endpoint 104 or 106.

The direction of each control point 108 or 110 may generally determine a direction in which the corresponding cubic Bézier curve initially travels from the corresponding endpoint 104 or 106. For instance, because the direction of the control point 108 is directly rightward from the endpoint 104, the single cubic Bézier curve that makes up the curved connector 102 in FIG. 1A initially travels directly rightward. As another example, because the direction of the control point 110 is directly upward from the endpoint 106, the single cubic Bézier curve that makes up the curved connector 102 in FIG. 1A initially travels directly upward.

The distance of the control point 108 or 110 from the corresponding endpoint 104 or 106 may generally determine how far the corresponding Bézier curve is pulled in the direction of the corresponding control point 108 or 110 before curving toward the next designated point (e.g., the endpoint 106 or 104 in FIG. 1A) that defines an end of the corresponding Bézier curve. Examples of how distances of control points may affect corresponding Bézier curves are described below.

The endpoints 104 and 106 may be designated, e.g., by the user, when the user generates the curved connector 102. In the example of FIG. 1A, the user may have designated the endpoints 104 and 106 as designated points by a click, drag, and release operation with a mouse, e.g., clicking a button on the mouse while a mouse pointer 112 is on a point (e.g., the endpoint 104) on a first block 114 and the diagram application is in a connector drawing mode, dragging the mouse pointer 112 to another point (e.g., the endpoint 106) on a second block 116, and releasing the button on the mouse. One or both of the endpoints 104 or 106 can alternatively be unassociated with blocks or other objects such as the first and second blocks 114 and 116 depending on the location of the mouse pointer 112 relative to any other objects when the click, drag, and release operation is performed while in the connector drawing mode.

Some diagram applications also allow users to designate one or more additional designated points that are intermediate between the endpoints 104 and 106. Such designated points may be referred to as intermediate points. For instance, in FIG. 1B, the curved connector 102 includes an intermediate point 118 as a designated point in addition to the endpoints 104 and 106. The user may designate the intermediate point 118 as a designated point by, e.g., grabbing a desired point in the curved connector 102 in FIG. 1A and then dragging it elsewhere, which may be effective to designate the desired point as the intermediate point 118, which may thereafter be one of the designated points of the curved connector 102.

Designation of the intermediate point 118 as a designated point increases by one a number of Bézier curves that make up the curved connector 102 with the intermediate point 118 being an endpoint for each of two Bézier curves that extend in opposite directions from the intermediate point 118. Thus, whereas there is a single cubic Bézier curve that makes up the curved connector 102 in FIG. 1A, in FIG. 1B there are two cubic Bézier curves 120 and 122 that make up the curved connector 102. Similarly, designation of any additional intermediate points as designated points may increase by one the number of Bézier curves that make up the curved connector 102 for each additional intermediate point, with each additional intermediate point being an endpoint for each of two Bézier curves that extend in opposite directions from the intermediate point 118. Stated another way, a curved connector with N designated points (including endpoints and intermediate points) may be made up of N−1 Bézier curves in some embodiments.

The intermediate point 118 may have two control points 124 and 126 associated with it. The control point 124 determines a shape of the cubic Bézier curve 120 together with the control point 108 and the endpoint 104 and the intermediate point 118 that define ends of the cubic Bézier curve 120. Similarly, the control point 126 determines a shape of the cubic Bézier curve 122 together with the control point 110 and the endpoint 106 and the intermediate point 118 that define ends of the cubic Bézier curve 122. Any additional intermediate points similarly have two control points that determine the shape of two corresponding Bézier curves together with corresponding designated points and control points.

As a constraint for smoothness of the curved connector 102, the intermediate point 118 at which the cubic Bézier curves 120 and 122 meet may be required to be on a straight line between the two control points 124 and 126. Similarly, every other intermediate point designated as a designated point for the curved connector 102 may have two associated control points that satisfy the constraint of the corresponding intermediate point being on a straight line between the two corresponding control points.

FIGS. 1A and 1B together additionally illustrate effects of adjusting a distance and/or direction of control points relative to their associated designated point. For instance, compared to FIG. 1A, in FIG. 1B the distance of the control point 108 from the endpoint 104 has increased and the direction of the control point 108 has been changed. The new direction of the control point 108 causes the Bézier curve 120 to initially travel from the endpoint 104 in the new direction and the increased distance of the control point 108 from the endpoint 104 pulls the Bézier curve 120 further in the new direction before the Bézier curve curves toward the next designated point (e.g., the intermediate point 118 in the example of FIG. 1B). From FIG. 1A to FIG. 1B, a similar adjustment has been made and a similar affect occurs with respect to the control point 110.

The curved connector 102 in FIGS. 1A and 1B additionally passes through points other than the designated points (e.g., endpoints 104 and 106 and/or intermediate point 118). The designated points constrain the curved connector 102 to pass through the designated points. Adjustments to locations of the designated points, distances of the corresponding control points, and/or directions of the corresponding control points may result in the curved connector 102 passing through at least some different non-designated points than before, while still starting or stopping at or passing through all the designated points of the curved connector 102.

In some diagram applications, users can edit curved connectors such as the curved connector 102 by moving designated points from one location to another and/or by changing the distance and/or direction of control points. When only locations of designated points are changed, the shape of the curved connector often looks different than what the users intended and the users have to take additional steps to adjust the shape of the curved connector to a desired shape, e.g., by adjusting distance and/or direction of one or more control points. An example is described with respect to FIGS. 2A-2C.

Figure 2A:
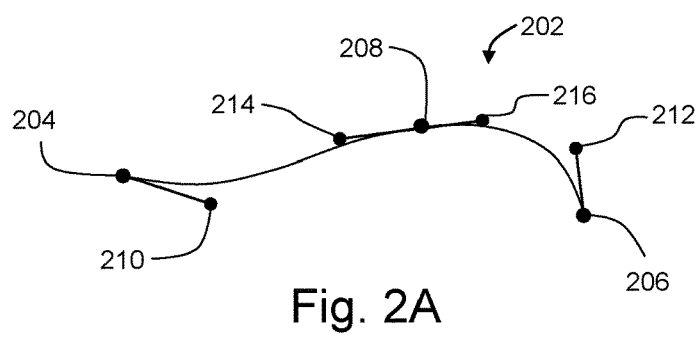
FIGS. 2A-2C illustrate another curved connector with endpoints and an intermediate point.
Figure 2B:
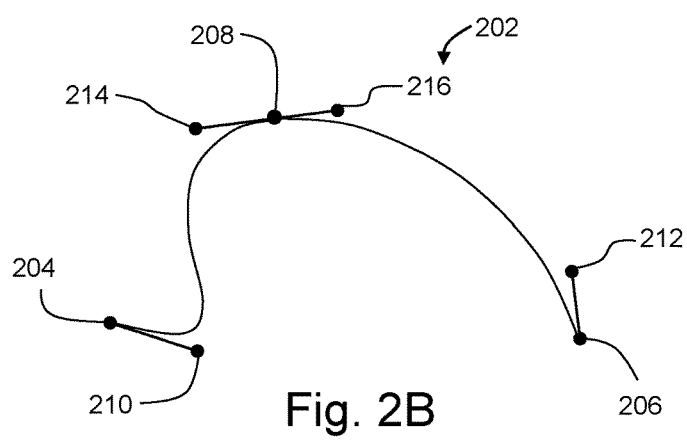
Figure 2C:
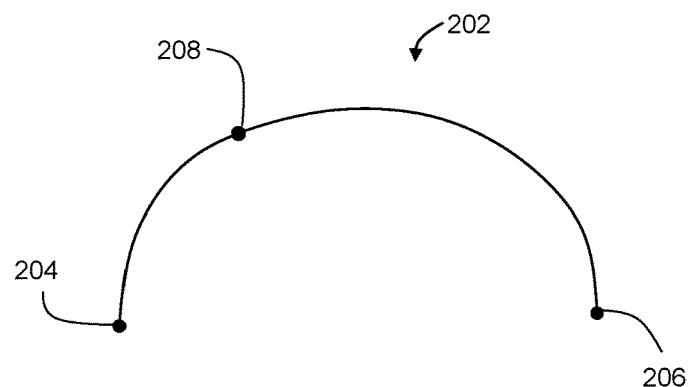

FIGS. 2A-2C illustrate a curved connector 202 with endpoints 204 and 206 and an intermediate point 208. The endpoint 204 has an associated control point 210, the end point 206 has an associated control point 212, and the intermediate point 208 has associated control points 214 and 216.

FIG. 2B illustrates a shape of the curved connector 202 that may result if, beginning from FIG. 2A, the intermediate point 208 is moved relative to the endpoints 204 and 206 to a new location illustrated in FIG. 2B (and in FIG. 2C) without adjusting distances and/or locations of any of the control points 210, 212, 214, or 216.

In comparison, FIG. 2C illustrates what may be the intended shape of the curved connector 202 intended by a user that moved the intermediate point to the new location. In many diagram applications, the user cannot get the intended shape of FIG. 2C for the curved connector 202 by only moving the intermediate point 208 to the new location of FIG. 2B (and of FIG. 2C). Instead, the user additionally has to manually adjust the location and/or direction of one or more of the control points 210, 212, 214, and 216 to get the intended shape of FIG. 2C for the curved connector 202 or otherwise directly specify one or more of the control points 210, 2121, 214, or 216 (including its location and/or direction).

To simplify the process of editing shapes of curved connectors, embodiments described herein infer distances and directions of control points relative to designated points to allow users to adjust locations of designated points to get desired shapes for curved connectors without also having to manually directly specify the control points (e.g., their distances and/or directions). The distance and direction together may be inferred according to some embodiments by inferring a location of such a control point relative to an associated designated point. The control points whose distances and directions are inferred may not be displayed to the user even when the user is editing the curved connector such that the user may in some embodiments be unable to manually adjust the distance and/or direction of such control points.

An example will now be described with reference to FIG. 3, which is a flowchart of a method 300 to generate a curved connector that passes through multiple designated points in a diagram, arranged in accordance with at least one embodiment described herein. The method 300 may generate the curved connector with inferred control points and without a user having to manually directly specify control points. The method 300 may be programmably performed or controlled by a processor in, e.g., a computer or server that executes a diagram application used by the user to generate graphical objects that include curved connectors. An example computing device that may correspond to the foregoing computer or server and that includes one or more processors that may perform or control performance of the method 300 is described below with respect to FIG. 7.

The method 300 may begin at block 302, in which input effective to designate multiple designated points of a curved connector is received. For instance, receiving the input may include receiving input that indicates that a user has performed a click, drag, and release operation while in a connector drawing mode to designate at least endpoints of the curved connector that are included as the designated points. The received input may include coordinates of the endpoints, e.g., coordinates of a mouse cursor on the display device when the click is performed (for an initial endpoint) and when a release is performed (for a final endpoint). Receiving the input may additionally include receiving input that indicates the user has performed one or more click, drag, and release operations somewhere on the curved connector between the endpoints to designate one or more intermediate points as designated points. Accordingly, the designated points may include at least two endpoints and one or more intermediate points. To distinguish between the two endpoints, one may be referred to as an initial endpoint and the other may be referred to as a final endpoint. Block 302 may be followed by block 304.

At block 304, for each of the one or more intermediate points, a first control point and a second control point may be inferred without receiving input effective to directly specify the first control point or the second control point. Although not illustrated in FIG. 3, the method 300 may additionally include, for each of the endpoints, inferring a control point associated with the endpoint without receiving input effective to directly specify the control points associated with the endpoints. In general, the control points for each designated point may be inferred based at least on a distance between the corresponding designated point and a preceding designated point or a distance between the corresponding designated point and a subsequent designated point, as applicable. The preceding designated point may include an immediately preceding designated point and the subsequent designated point may include an immediately subsequent designated point in some embodiments. Additional details regarding aspects of inferring control points are described elsewhere herein. Block 304 may be followed by block 306.

At block 306, a first curve to include in the curved connecter between the corresponding intermediate point and the preceding designated point may be calculated based at least on the first control point. Calculating the first curve may include calculating a first cubic Bézier curve based on the corresponding intermediate point and the preceding designated point as its endpoints and the first control point and a control point inferred for the preceding designated point. Any method suitable to calculate the first curve as a cubic Bézier curve using two endpoints and two control points may be implemented. In other embodiments, the first curve may be calculated as a quadratic or fourth order or higher Bézier curve based on the first control point and/or one or more other inferred control points. Block 306 may be followed by block 308.

At block 308, a second curve to include in the curved connecter between the corresponding intermediate point and the subsequent designated point may be calculated based at least on the second control point. Calculating the second curve may include calculating a second cubic Bézier curve based on the corresponding intermediate point and the subsequent designated point as its endpoints and the second control point and a control point inferred for the subsequent designated point. As above, any method suitable to calculate the second curve as a cubic Bézier curve using two endpoints and two control points may be implemented. In other embodiments, the second curve may be calculated as a quadratic or fourth order or higher Bézier curve based on the second control point and/or one or more other inferred control points.

Figure 3:
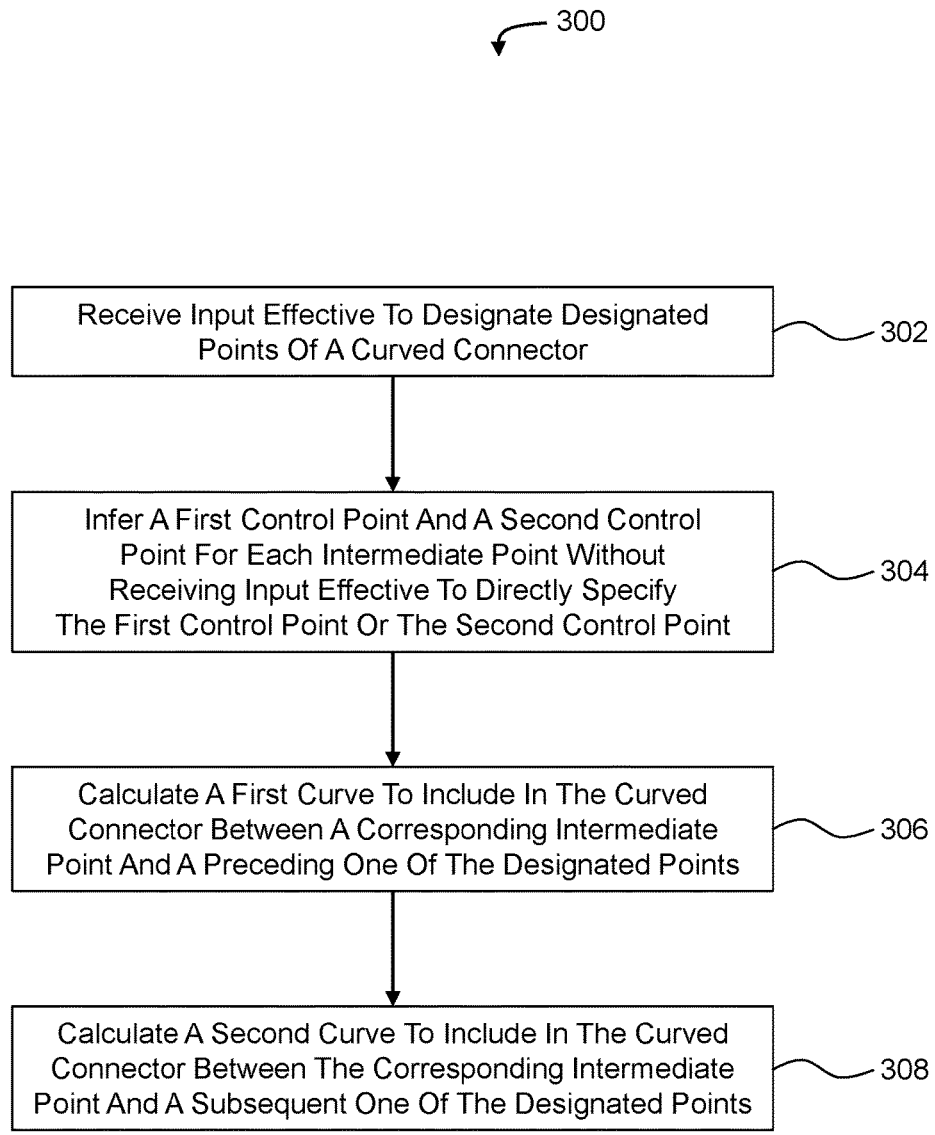
FIG. 3 is a flowchart of an example method to generate a curved connector that passes through multiple designated points in a diagram.

Although not illustrated in FIG. 3, the method 300 may additionally include one or more other operations or functions. For instance, the method 300 may additionally include outputting the curved connector that includes the first curve and the second curve to a display device. In some embodiments, the method 300 may execute in real time or substantially in real time. In these and other embodiments, as a user designates designated points for the curved connector and/or moves designated points around on the display device, the curves that make up the curved connector and that are affected by the designation of new designated points and/or by movement of designated points may be calculated (based on one or more inferred control points) and re-rendered/output to the display device in real time or substantially in real time.

Generally, the designated points of the curved connector may include a number N of designated points. The method 300 may additionally include calculating N-1 curves that include the first curve and the second curve. Calculating the N-1 curves may include calculating a curve between each adjacent pair of designated points included in the designated points based on two control points inferred for each of the N-1 curves. The two control points inferred for each of the N-1 curves may include a different control point inferred for each designated point included in each adjacent pair of designated points. The method 300 may additionally include outputting the curved connector that includes the N-1 curves to the display device.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Moreover, some or all of the functions or blocks described in these and other processes and methods may be implemented by one or more processors executing computer-readable instructions stored on one or more non-transitory computer-readable media. Execution by the processors of the computer-readable instructions may cause the processors to perform or control performance of the functions or blocks. The one or more processors may include one or more processors in a computer operated by the user, one or more processors in a server in communication with the computer operated by the user, and/or one or more processors described below with respect to FIG. 7. The non-transitory computer-readable media may include one or more non-transitory computer-readable media included in or accessible to the foregoing computer or server or one or more non-transitory computer-readable media described below with respect to FIG. 7. The computer-readable instructions may include one or more of a diagram application or other application or software module thereof executing on the foregoing computer or server and/or a diagram application described below with respect to FIG. 7.

Figure 4A:
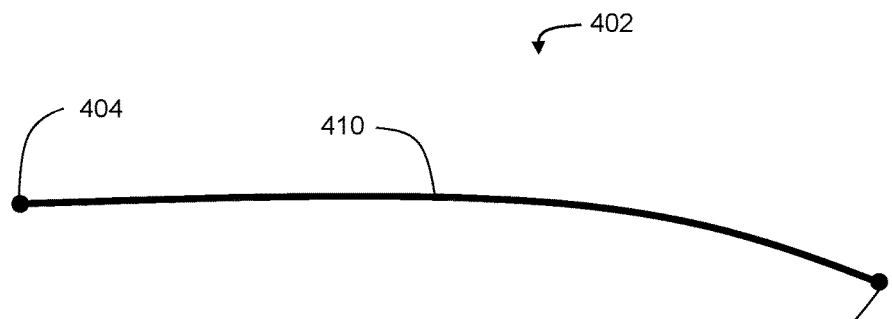
FIGS. 4A and 4B illustrate another curved connector with two endpoints designated as designated points of the curved connector.
Figure 4B:
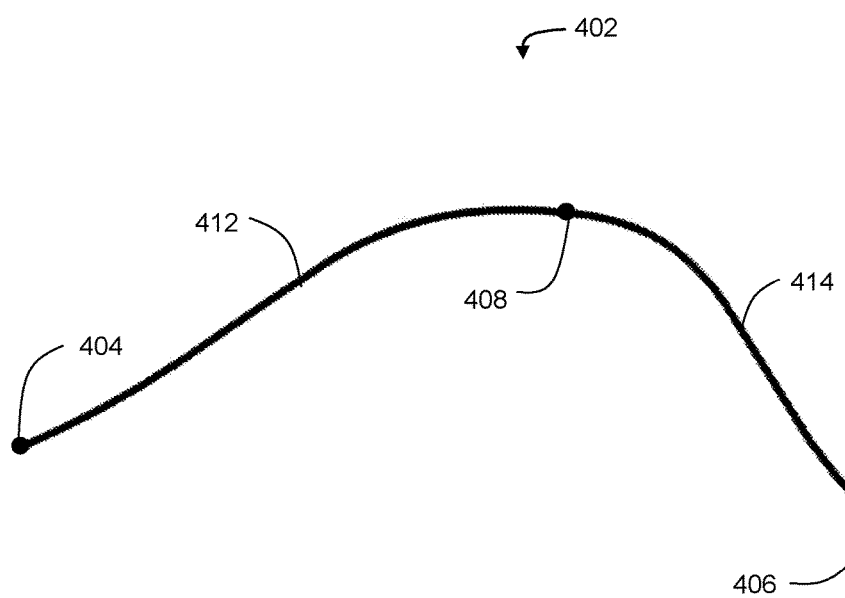

An example implementation of the method 300 of FIG. 3 will now be discussed together with FIGS. 4A and 4B. FIGS. 4A and 4B illustrate a curved connector 402 with two endpoints 404 and 406 designated as designated points of the curved connector 402, arranged in accordance with at least one embodiment described herein. To distinguish between the two endpoints 404 and 406, the endpoint 404 will be referred to as an initial endpoint 404 and the endpoint 406 will be referred to as a final endpoint 406. These designations are arbitrary and could be switched.

In FIG. 4B, the curved connector 402 additionally includes an intermediate point 408. The initial end point 404 and the final endpoint 406 each have an inferred control point (not shown in FIGS. 4A and 4B) and the intermediate point 408 has two inferred control points (not shown in FIGS. 4A and 4B).

With combined reference to FIGS. 3 and 4A, and in response to receiving input effective to designate the initial and final endpoints 404 and 406 as designated points of the curved connector 402 at block 302, a control point for each of the initial and final endpoints 404 and 406 may be inferred and a single cubic Bézier curve 410 may be calculated based on the initial and final endpoints 404 and 406 and the inferred control points. The cubic Bézier curve 410 may be output to a display device. Alternatively, in some embodiments the curved connector 410 may instead be implemented as a straight connector where it includes only two designated points.

With combined reference to FIGS. 3 and 4B, and in response to receiving input effective to additionally designate the intermediate point 408 as one of the designated points of the curved connector 402 at block 302 of the method 300, first and second control points (not shown) may be inferred for the intermediate point 408 at block 304 of the method 300 without receiving input effective to directly specify the first control point or the second control point. At block 306, a first cubic Bézier curve 412 to include in the curved connector 402 between the intermediate point 408 and the preceding point (e.g., the initial endpoint 404 in FIG. 4B) may be calculated based at least on the first control point. At block 308, a second cubic Bézier curve 414 to include in the curved connector 402 between the intermediate point 408 and the subsequent point (e.g., the final endpoint 404) may be calculated based at least on the second control. The first and second cubic Bézier curves 412 and 414 may then be output to the display device.

Figure 5:
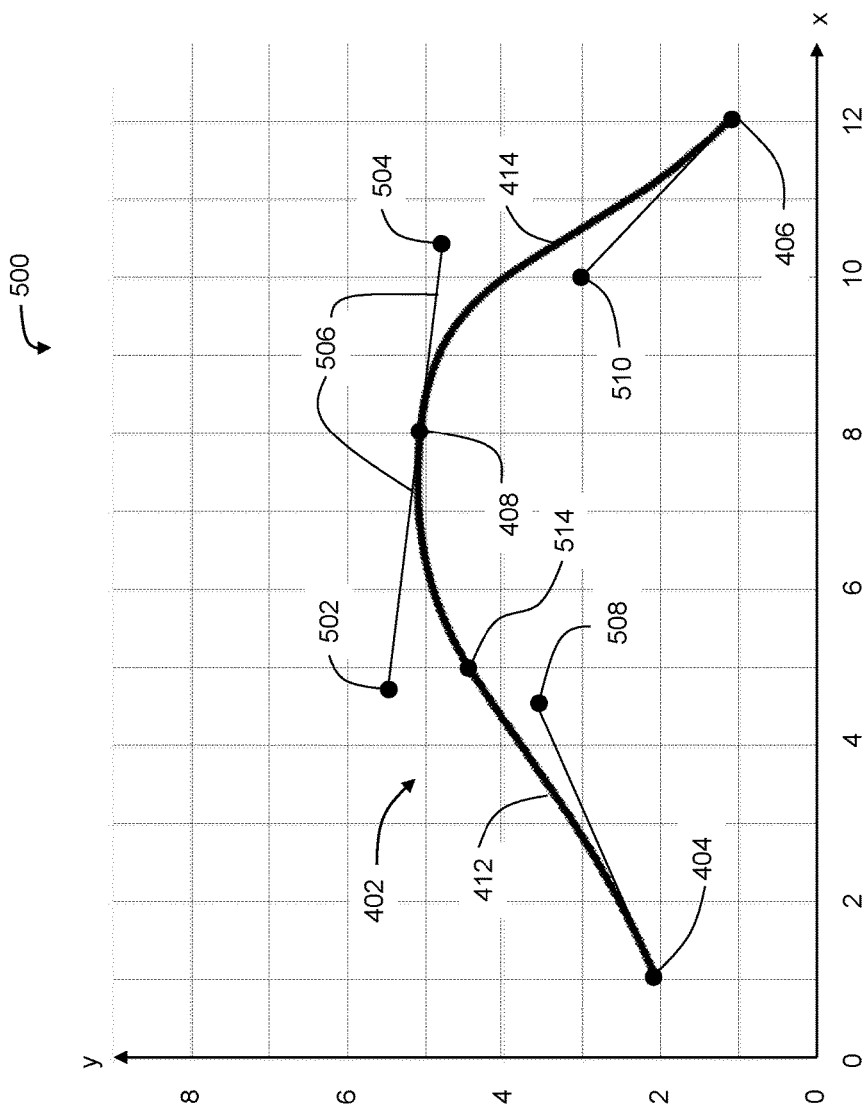
FIG. 5 illustrates a Cartesian coordinate plane on which the curved connector and the designated points of FIG. 4B have been plotted.

A description of example embodiments to infer control points for designated points of a curved connector will now be provided with combined reference to FIGS. 4B-5. FIG. 5 illustrates a Cartesian coordinate plane 500 on which the curved connector 402 and the designated points of the curved connector 402 of FIG. 4B have been plotted where the designated points include the initial and final endpoints 404 and 406 and the intermediate point 408, arranged in accordance with at least one embodiment described herein.

The Cartesian coordinate plane 500 includes a horizontal x axis and a vertical y axis along with dashed horizontal and vertical lines that sequentially increment by one unit along the x and y axes. The Cartesian coordinate plane 500 would not generally be displayed on the display device to the user with the curved connector 402, although it or another Cartesian coordinate plane could be displayed on the display device in some embodiments. Instead, the Cartesian coordinate plane 500 is illustrated in FIG. 5 (and in FIG. 6) as an aid in understanding embodiments disclosed herein. The computer or server that runs the diagram application or other application or module that generates the curved connector 402 may nevertheless assign or otherwise use Cartesian coordinates in a Cartesian coordinate plane to each of the designated points of the curved connector 402 whether or not the corresponding Cartesian coordinate plane is ever displayed on the display device to the user.

In FIG. 5, the initial endpoint 402 has Cartesian coordinates of (1, 2) in the Cartesian coordinate plane 500. The intermediate point 408 has Cartesian coordinates of (8, 5) in the Cartesian coordinate plane 500. The final endpoint 406 has Cartesian coordinates of (12, 1) in the Cartesian coordinate plane 500.

FIG. 5 additionally illustrates first and second control points 502 and 504 that may be inferred for the intermediate point 408 as follows. The first and second control points 502 and 504 and other inferred control points according to some embodiments would not generally be displayed on the display device to the user with the curved connector 402, although in some embodiments they could be. Instead, the first and second control points 502 and 504 and other inferred control points are illustrated in FIG. 5 (and in FIG. 6) as an aid in understanding embodiments disclosed herein.

The first and second control points 502 and 504 may be inferred without the user having to manually and directly specify the first and second control points 502 and 504 (and more particularly, their locations and/or directions). The first and second control points 502 and 504 in the instant example have Cartesian coordinates of, respectively, about (4.84, 5.29) and (10.34, 4.79). The Cartesian coordinates of the first and second control points 502 and 504 as inferred may be calculated as follows.

First, a first distance $l_1$ between the designated point (e.g., the intermediate point 408 in this example) and the preceding designated point (e.g., the initial endpoint 404 in this example) and a second distance $l_2$ between the designated point (e.g., the intermediate point 408 in this example) and the subsequent designated point (e.g., the final endpoint 406 in this example) may be calculated. Using the Pythagorean theorem and the Cartesian coordinates for the intermediate point 408, the initial endpoint 404, and the final endpoint 406, the distance $l_1$ may be calculated as the square root of $(8-1)^2+(5-2)^2$, which is about 7.62, and the distance $l_2$ may be calculated as the square root of $(12-8)^2+(1-5)^2$, which is about 5.66.

Next, a first force $F_1$ and a second force $F_2$ may be calculated according to equations 1 and 2:

$$F_1=[l_1/(l_1+l_2)]*CS \quad \text{(eq. 1);}$$

$$F_2=[l_2/(l_1+l_2)]*CS \quad \text{(eq. 2).}$$

In equations 1 and 2 and other equations discussed herein, CS is a constant. In an example embodiment, a value of CS is 0.5. In other embodiments, the value of CS may be different than 0.5, such as less than 0.5 or greater than 0.5.

Using concrete values in equations 1 and 2 according to the instant example, $F_1$ and $F_2$ can be calculated as follows:

$$F_1=[l_1/(l_1+l_2)]*CS=[7.6/(7.6+5.7)]*0.5=\text{about } 0.29;$$
and $$F_2=[l_2/(l_1+l_2)]*CS=[5.7/(7.6+5.7)]*0.5=\text{about } 0.21$$

Locations and directions of the first and second control points 502 and 504 may then be determined by subtracting one vector that depends on the first force F1 from the intermediate point 408 for the first control point 502 and adding another vector that depends on the second force F2 to the intermediate point 408 for the second control point 502. Alternatively or additionally, Cartesian coordinates of the first and second control points 502 and 504 (e.g., endpoints of the aforementioned vectors) may be calculated according to equations 3-6:

$$cp1.x=p1.x-F_1*(p2.x-p0.x) \quad \text{(eq. 3);}$$

$$cp1.y=p1.y-F_1*(p2.y-p0.y) \quad \text{(eq. 4);}$$

$$cp2.x=p1.x+F_2*(p2.x-p0.x) \quad \text{(eq. 5);}$$

$$cp2.y=p1.y+F_2*(p2.y-p0.y) \quad \text{(eq. 6).}$$

In equations 3-6:
cp1.x is an x coordinate of a first control point (e.g., the first control point 502 in this example);
cp1.y is a y coordinate of the first control point;
cp2.x is an x coordinate of a second control point (e.g., the second control point 504 in this example);
cp2.y is a y coordinate of the second control point;
p1.x is an x coordinate of the designated point (e.g., intermediate point 408 in this example) for which the first and second control points are being inferred;
p1.y is a y coordinate of the designated point for which the first and second control points are being inferred;
p0.x is an x coordinate of the preceding designated point (e.g., the initial endpoint 404 in this example);
p0.y is a y coordinate of the preceding designated point;
p2.x is an x coordinate of the subsequent designated point (e.g., the final endpoint 406 in this example);
p2.y is a y coordinate of the subsequent designated point; and $F_1$ and $F_2$ include values calculated according to equations 1 and 2.

Thus, using concrete values in equations 3-6 according to the instant example, cp1.x, cp1.y, cp2.x, and cp2.y for the first and second control points 502 and 504 of this example can be calculated as follows:

$$cp1.x=p1.x-F_1*(p2.x-p0.x)=8-0.29*(12-1)=\text{about } 4.84;$$

$$cp1.y=p1.y-F_1*(p2.y-p0.y)=5-0.29*(1-2)=\text{about } 5.29;$$

$$cp2.x=p1.x+F_2*(p2.x-p0.x)=8+0.21*(12-1)=\text{about } 10.34; \text{ and}$$

$$cp2.y=p1.y+F_2*(p2.y-p0.y)=5+0.21*(1-2)=\text{about } 4.79.$$

In other words, the (x, y) coordinates in the Cartesian coordinate plane 500 of FIG. 5 of the first control point 502 are about (4.84, 5.29) while those of the second control point 504 are about (10.34, 4.79). It can be seen from FIG. 5 that the intermediate point 408 is located on a straight line 506 between the first and second control points 502 and 504, thereby satisfying the constraint for smoothness of curved connectors as described above. Application of equations 1-6 to infer two control points for any intermediate point will similarly result in the corresponding intermediate point being located on a straight line between the two inferred control points.

Equations 1-6 have been described above in the context of the intermediate point 408 with the initial and final endpoints 404 and 406 as its preceding and subsequent points. More generally, equations 1-6 can be implemented to infer control points for any designated point that is an intermediate point.

Further, after inferring the first and second control points 502 and 504, the first and second curves 412 and 414 may be calculated as cubic Bézier curves based on the endpoints of each curve (e.g., the initial endpoint 404 and the intermediate point 408 for the first curve 412 and the intermediate point 408 and the final endpoint 406 the for the second curve 414) and based on the control points of each curve.

Embodiments described herein may alternatively or additionally infer control points for endpoints of curved connectors. As an example, FIG. 5 additionally illustrates an initial control point 508 for the initial endpoint 404 and a final control point 510 for the final endpoint 406. The initial and final control points 508 and 510 may be inferred without the user having to manually and directly specify the initial and final control points 508 and 510 (and more particularly, their locations and/or directions). The initial and final control points 508 and 510 in the instant example have Cartesian coordinates of, respectively, about (4.5, 3.5) and about (10, 3). The Cartesian coordinates of the initial and final control points 508 and 510 as inferred may be calculated as follows.

To infer the initial control point 508, first an initial distance $l_i$ between the initial endpoint 404 and a subsequent designated point may be calculated. In this particular example, the subsequent designated point is the intermediate point 408 such that the initial distance $l_i$ is equal to the first distance $l_1$, or about 7.62 in this example. Similarly, to infer the final control point 510, a final distance $l_f$ between the final endpoint 406 and a preceding designated point may be calculated. In this particular example, the preceding designated point is the intermediate point 408 such that the final distance $l_f$ is equal to the second distance $l_2$, or about 5.66 in this example.

Next, an endpoint normal vector $n_1$ may be determined that is associated with the initial endpoint 404, and an endpoint normal vector $n_2$ may be determined that is associated with the final endpoint 406. In some embodiments, if the initial or final endpoint 404 or 406 is on a perimeter of a block or other graphical object (as in the example of FIGS. 1A and 1B), the corresponding endpoint normal vector $n_1$ or $n_2$ may be determined as a unit vector (e.g., magnitude of 1) with a direction that is perpendicular to the perimeter of the block or other graphical object at the location of the initial or final endpoint 404 or 406 on the perimeter. In some embodiments, if the initial or final endpoint 404 or 406 is not on a perimeter of a block or other graphical object, the corresponding endpoint normal vector $n_1$ or $n_2$ may be determined as a unit vector with a direction that points directly from the initial or final endpoint 404 or 406 to the subsequent or preceding designated point. In the example of FIG. 5, it is assumed that neither the initial endpoint 404 nor the final endpoint 406 is on a perimeter of a block or other graphical object such that the endpoint normal vector $n_1$ has a direction that points directly from the initial endpoint 404 to the intermediate point 408 and the endpoint normal vector $n_2$ has a direction that points directly from the final endpoint 406 to the intermediate point 408. The endpoint normal vector $n_1$ in this example may be calculated as about (0.92, 0.39) and the endpoint normal vector $n_2$ in this example may be calculated as about (−0.71, 0.71).

Next, Cartesian coordinates of the initial and final control points 508 and 510 may be calculated according to equations 7-10:

$$icp.x = iep.x + n_1.x * l_i * CS \quad (\text{eq. 7});$$

$$icp.y = iep.y + n_1.y * l_i * CS \quad (\text{eq. 8});$$

$$fcp.x = fep.x + n_2.x * l_f * CS \quad (\text{eq. 9});$$

$$fcp.y = fep.y + n_2.y * l_f * CS \quad (\text{eq. 10}).$$

In equations 7-10:
icp.x is an x coordinate of an initial control point (e.g., the initial control point 508 in this example);
icp.y is a y coordinate of the initial control point;
iep.x is an x coordinate of an initial endpoint (e.g., the initial endpoint 404 in this example);
iep.y is a y coordinate of the initial endpoint;
fcp.x is an x coordinate of a final control point (e.g., the final control point 510 in this example);
fcp.y is a y coordinate of the final control point;
fep.x is an x coordinate of a final endpoint (e.g., the final endpoint 406 in this example);
fep.y is a y coordinate of the final endpoint;
$n_1.x$ is an x component of the endpoint normal vector $n_1$;
$n_1.y$ is a y component of the endpoint normal vector $n_1$;
$n_2.x$ is an x component of the endpoint normal vector $n_2$;
$n_2.y$ is a y component of the endpoint normal vector $n_2$;
$l_i$ and $l_f$ are the initial and final distances; and
CS is the same constant used in equations 1 and 2, which is 0.5 in some embodiments.

Thus, using concrete values in equations 7-10 according to the instant example, the Cartesian coordinates cp1.x, cp1.y, cp2.x, and cp2.y can be calculated for the initial and final control points 508 and 510 as follows:

$$icp.x = iep.x + n_1.x * l_i * CS = 1 + 0.39 * 7.6 * 0.5 = \text{about } 2.48;$$

$$icp.y = iep.y + n_1.y * l_i * CS = 2 + 0.92 * 7.6 * 0.5 = \text{about } 5.50;$$

$$fcp.x = fep.x + n_2.x * l_f * CS = 12 + (-0.71) * 5.7 * 0.5 = \text{about } 9.98; \text{ and}$$

$fcp.y=fep.y+n_2.y*l_f*CS=1+0.71*5.7*0.5=$ about 3.02.

In response to receiving input effective to move one or more of the designated points of a curved connector, some or all of the method 300 of FIG. 3 may be repeated with respect to at least some (but not necessarily all) curves that make up the curved connector. Analogously, in response to receiving input effective to designate on the curved connector a new intermediate point to include as one or more of the intermediate points included in the designated points and/or in response to receiving input effective to move the new intermediate point to a new location, some or all of the method 300 of FIG. 3 may be repeated with respect to at least some (but not necessarily all) curves that make up the curved connector. An example involving designation of a new intermediate point as a designated point and relocation thereof will now be described.

Figure 6:
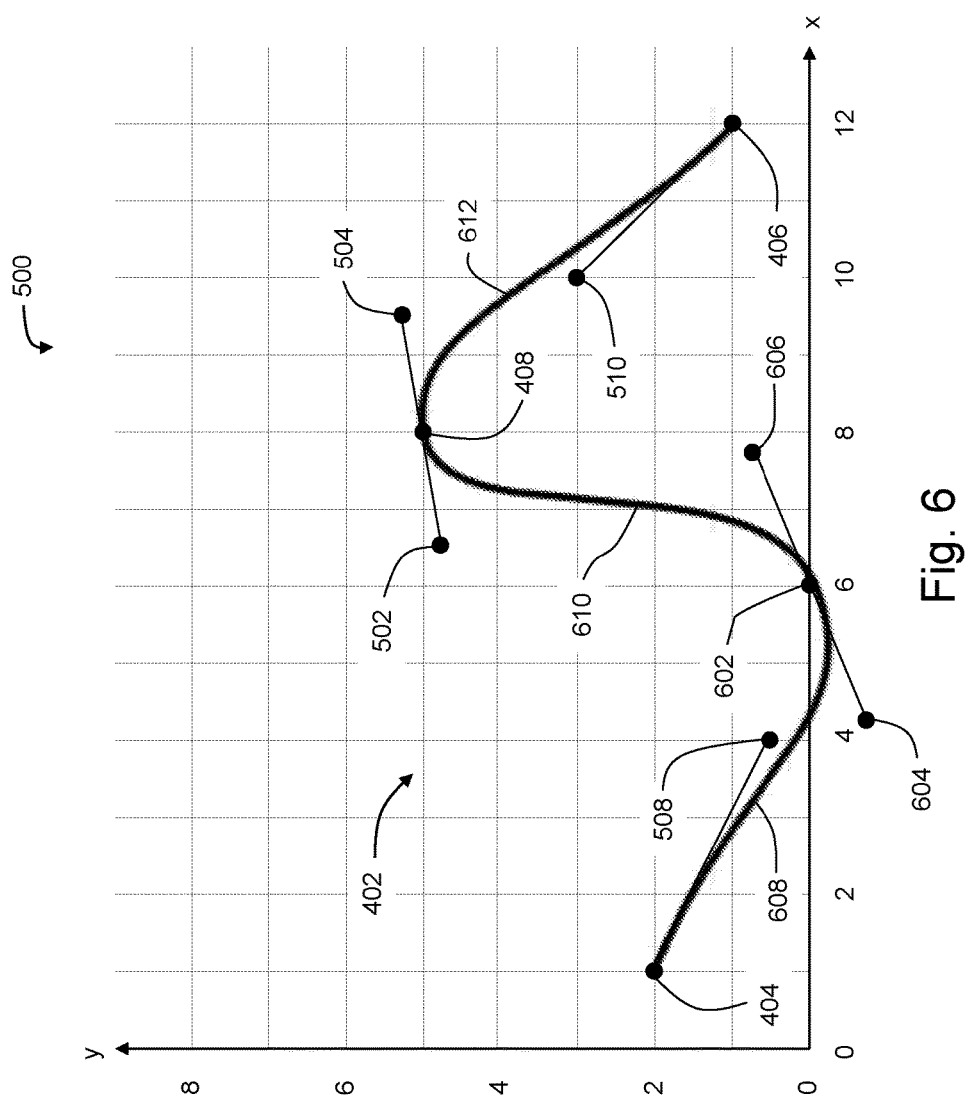
FIG. 6 illustrates the Cartesian coordinate plane of FIG. 5 together with the curved connector of FIGS. 4B and 5 and its designated points after designation of a new intermediate point.

FIG. 6 illustrates the Cartesian coordinate plane 500 of FIG. 5 together with the curved connector 402 and its designated points after designation of a new intermediate point 602 that is moved to a new location, arranged in accordance with at least one embodiment described herein. With combined reference to FIGS. 5 and 6, the new intermediate point 602 may be designated as a designated point by, e.g., the user performing a click, drag, and release operation to select and move what is initially a non-designated point 514 of the curved connector 402 at a first location of about (5, 4.5) in the Cartesian coordinate plane 500 in FIG. 5 to a second location of about (6, 0) in the Cartesian coordinate plane 500 in FIG. 6. The non-designated point 514 of FIG. 5 may become a designated point, e.g., the new intermediate point 602 of FIG. 6, by the user performing the click, drag, and release operation as described or by the user providing other suitable input.

First and second control points 604 and 606 may then be inferred for the new intermediate point 602 by applying equations 1-6 above in which:
the new intermediate point 602 at (6, 0) is assumed to be the designated point,
the initial endpoint 404 at (1, 2) is assumed to be the preceding designated point such that the first distance $l_1$ between the designated point and the preceding point is calculated as about 5.36, and
the intermediate point 408 at (8, 5) is assumed to be the subsequent designated point such that the second distance $l_2$ between the designated point and the subsequent point is calculated as about 5.36.

Under the foregoing assumptions, application of equations 1-6 results in the following:
$F_1$=about 0.25,
$F_2$=about 0.25, and
Cartesian coordinates of the first and second control points 604 and 606 associated with the new intermediate point 602 are respectively about (4.25, −0.75) and (7.75, 0.75), as illustrated in FIG. 6.

The designation of the new intermediate point 602 as a designated point and its relocation to Cartesian coordinates (6, 0) as illustrated in FIG. 6 also affects the first and second control points 502 and 504 of the intermediate point 408, as well as the initial control point 508 of the initial endpoint 404, all of which are inferred again as follows.

The first and second control points 502 and 504 of the intermediate point 408 may be re-inferred under the changed circumstances depicted in FIG. 6 by applying equations 1-6 above in which:
the intermediate point 408 at (8, 5) is assumed to be the designated point,
the new intermediate point 602 at (6, 0) is assumed to be the preceding designated point such that the first distance $l_1$ between the designated point and the preceding point is calculated as about 5.39, and
the final endpoint 406 at (12, 1) is assumed to be the subsequent designated point such that the second distance $l_2$ between the designated point and the subsequent point is calculated as about 5.66.

Under the foregoing assumptions, application of equations 1-6 results in the following:
$F_1$=about 0.24,
$F_2$=about 0.26, and
Cartesian coordinates of the first and second control points 502 and 504 associated with the intermediate point 408 are respectively about (6.54, 4.76) and (9.54, 5.26), as illustrated in FIG. 6.

The initial control point 508 of the initial endpoint 404 may be re-inferred under the changed circumstances depicted in FIG. 6 by applying equations 7-8 above in which:
the initial endpoint 404 at (1, 2) is assumed to be the initial endpoint,
the new intermediate point 602 at (6, 0) is assumed to be the subsequent designated point such that the initial distance $l_i$ between the initial endpoint and the subsequent designated point is calculated as about 4.12, and
the first unit normal vector is determined to have x and y components of about (0.97, −0.24).

Under the foregoing assumptions, application of equations 7-8 results in calculating Cartesian coordinates of the initial control point 508 associated with the initial endpoint 404 as about (4, 0.5), as illustrated in FIG. 6.

The designation of the new intermediate point 602 as a designated point and its relocation as illustrated in FIG. 6 does not affect the final control point 510 of the final endpoint 406. Thus, the final control point 510 is not re-inferred.

After calculating the first and second control points 604 and 606 of the new intermediate point 602 and re-inferring all other control points affected by the designation of the new intermediate point 602 as a designated point and its relocation as illustrated in FIG. 6, any curves of the curved connector 402 that have new or re-inferred control points may be calculated and output to a display device. In particular, in the example of FIG. 6, a first cubic Bézier curve 608 between the initial endpoint 404 and the new intermediate point 602, a second cubic Bézier curve 610 between the new intermediate point 602 and the intermediate point 408, and a third cubic Bézier curve 612 between the intermediate point 408 and the final endpoint 406 may all be calculated and output to the display device.

The calculation of each of the first, second, and third cubic Bézier curves 608, 610, and 612 may be based on the two corresponding designated points that are endpoints thereof and based on two corresponding control points. In particular, the calculation of the first cubic Bézier curve 608 may be based on the initial endpoint 404, the new intermediate point 602, the initial control point 508 of the initial endpoint 404, and the first control point 604 of the new intermediate point 602. Analogously, the calculation of the second cubic Bézier curve 610 may be based on the new intermediate point 602, the intermediate point 408, the second control point 606 of the new intermediate point 602, and the first control point 502 of the intermediate point 408. Analogously, the calculation of the third cubic Bézier curve 612 may be based on the intermediate point 408, the final endpoint 406, the second control point 504 of the intermediate point 408, and the final control point 510 of the final end point 406.

Figure 7:
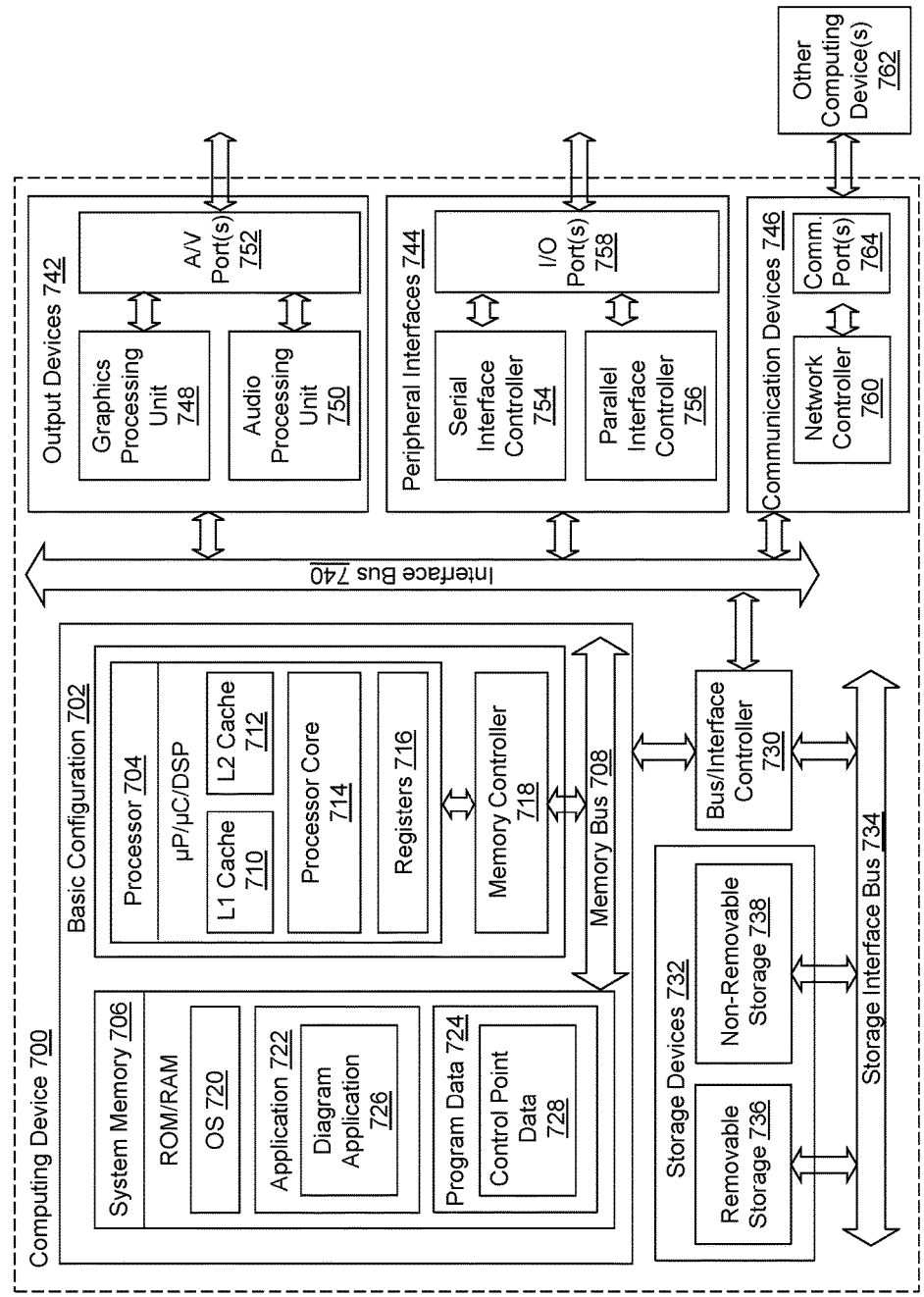
FIG. 7 is a block diagram illustrating an example computing device that is arranged for curve editing in a diagram application or other application, all arranged in accordance with at least one embodiment described herein.

FIG. 7 is a block diagram illustrating an example computing device 700 that is arranged for curve editing in a diagram application or other application, arranged in accordance with at least one embodiment described herein. In a basic configuration 702, the computing device 700 typically includes one or more processors 704 and a system memory 706. A memory bus 708 may be used to communicate between the processor 704 and the system memory 706.

Depending on the desired configuration, the processor 704 may be of any type including, but not limited to, a microprocessor (µP), a microcontroller (µC), a digital signal processor (DSP), or any combination thereof. The processor 704 may include one or more levels of caching, such as a level one cache 710 and a level two cache 712, a processor core 714, and registers 716. The processor core 714 may include an arithmetic logic unit (ALU), a floating point unit (FPU), a digital signal processing core (DSP Core), or any combination thereof. An example memory controller 718 may also be used with the processor 704, or in some implementations the memory controller 718 may include an internal part of the processor 704.

Depending on the desired configuration, the system memory 706 may be of any type including volatile memory (such as RAM), nonvolatile memory (such as ROM, flash memory, etc.), or any combination thereof. The system memory 706 may include an operating system 720, one or more applications 722, and program data 724. The application 722 may include a diagram application 726 that is arranged to infer control points (including their locations and/or directions relative to associated designated points) of curved connectors without requiring direct manual specification or editing of the control points, as described herein. The program data 724 may include control point data 728 (e.g., coordinates of control points), designated point data (e.g., coordinates of designated points), and/or endpoint normal vector data (e.g., x and/or y components thereof) as is described herein, or other diagram application data. In some embodiments, the application 722 may be arranged to operate with the program data 724 on the operating system 720 such that the method 300 of FIG. 3 may be provided as described herein.

The computing device 700 may have additional features or functionality, and additional interfaces to facilitate communications between the basic configuration 702 and any involved devices and interfaces. For example, a bus/interface controller 730 may be used to facilitate communications between the basic configuration 702 and one or more data storage devices 732 via a storage interface bus 734. The data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 706, the removable storage devices 736, and the non-removable storage devices 738 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 700. Any such computer storage media or non-transitory computer-readable media may be part of the computing device 700.

The computing device 700 may also include an interface bus 740 to facilitate communication from various interface devices (e.g., output devices 742, peripheral interfaces 744, and communication devices 746) to the basic configuration 702 via the bus/interface controller 730. The output devices 742 include a graphics processing unit 748 and an audio processing unit 750, which may be configured to communicate to various external devices such as a display or speakers via one or more A/V ports 752. Diagrams, flowcharts, organizational charts, connectors, and/or other graphical objects generated by the diagram application 726 may be output through the graphics processing unit 748 to such a display. The peripheral interfaces 744 include a serial interface controller 754 or a parallel interface controller 756, which may be configured to communicate with external devices such as input devices (e.g., keyboard, mouse, pen, voice input device, touch input device, etc.), sensors, or other peripheral devices (e.g., printer, scanner, etc.) via one or more I/O ports 758. Such input devices may be operated by a user to provide input to the diagram application 726, which input may be effective to, e.g., generate curved connectors, designate points as designated points of one or more curved connectors, relocate one or more designated points, and/or to accomplish other operations within the diagram application 726. The communication devices 746 include a network controller 760, which may be arranged to facilitate communications with one or more other computing devices 762 over a network communication link via one or more communication ports 764.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 700 may be implemented as a portion of a small-form factor portable (or mobile) electronic device such as a smartphone, a personal data assistant (PDA) or an application-specific device. The computing device 700 may also be implemented as a personal computer including tablet computer, laptop computer, and/or non-laptop computer configurations, or a server computer including both rack-mounted server computer and blade server computer configurations.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

One skilled in the art will appreciate that, for this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to generate a curved connector that passes through a plurality of designated points in a diagram, the method comprising:
    receiving input effective to designate the plurality of designated points of the curved connector, the plurality of designated points including an initial endpoint, a final endpoint, and intermediate points between the initial endpoint and the final endpoint, each of the intermediate points directly designated by user input and included in the curved connector, wherein the intermediate points designated by the user input remain as designated points through which the curved connector passes responsive to further user input that changes the curved connector;
    inferring, for each of the intermediate points, a first control point and a second control point without receiving user input effective to directly specify the first control point or the second control point;
    calculating:
        a first curve to include in the curved connector between a corresponding one of the intermediate points and a preceding one of the plurality of designated points based at least on the first control point; and
        a second curve to include in the curved connector between the corresponding one of the intermediate points and a subsequent one of the plurality of designated points based at least on the second control point;
    receiving user input effective to move a given one of the intermediate points of the curved connector from a first location on the display device to a different location on the display device;
    inferring a new first control point and a new second control point for at least one of the plurality of designated points that is adjacent to the given one of the intermediate points; and
    updating the curved connector on the display device by outputting a plurality of new curves as part of the curved connector, the plurality of new curves determined based on all of the new first control points and all of the new second control points, wherein the curved connector passes through all of the intermediate points.

2. The method of claim 1, wherein:
    inferring the first control point includes calculating a first distance between the corresponding one of the intermediate points and the preceding one of the plurality of designated points; and
    inferring the second control point includes calculating a second distance between the corresponding one of the intermediate points and the subsequent one of the plurality of designated points.

3. The method of claim 1, wherein:
    calculating the first curve includes calculating a first cubic Bezier curve based on the corresponding one of the intermediate points, the preceding one of the plurality of designated points, the first control point, and a control point associated with the preceding one of the plurality of designated points; and
    calculating the second curve includes calculating a second cubic Bezier curve based on the corresponding one of the intermediate points, the subsequent one of the plurality of designated points, the second control point, and a control point associated with the subsequent one of the plurality of designated points.

4. The method of claim 1, further comprising:
inferring, for the initial endpoint, an initial control point without receiving input effective to directly specify the initial control point, wherein a shape of an initial curve between the initial endpoint and a subsequent one of the intermediate points depends on the initial control point; and
inferring, for the final endpoint, a final control point without receiving input effective to directly specify the final control point, wherein a shape of a final curve between the final endpoint and a preceding one of the intermediate points depends on the final control point.

5. The method of claim 4, wherein:
inferring the initial control point includes:
calculating an initial distance between the initial endpoint and the subsequent one of the intermediate points; and
determining an endpoint normal vector $n_1$ associated with the initial endpoint; and inferring the final control point includes:
calculating a final distance between the final endpoint and the preceding one of the intermediate points; and
determining an endpoint normal vector $n_2$ associated with the final endpoint.

6. The method of claim 5, wherein:
inferring the initial control point further includes calculating Cartesian coordinates icp.x and icp.y of the initial control point according to:

$$icp.x = iep.x + n_1.x * l_1 * CS; \text{ and}$$

$$icp.y = iep.y + n_1.y * l_1 * CS;$$

wherein iep.x and iep.y are Cartesian coordinates of the initial endpoint, $n_1.x$ is a x component and $n_1.y$ is a y component of the endpoint normal vector $n_1$ associated with the initial endpoint, $l_i$ is the initial distance, and CS is a constant; and
inferring the final control point further includes calculating Cartesian coordinates fcp.x and fcp.y of the final control point according to:

$$fcp.x = fep.x + n_2.x * l_f * CS; \text{ and}$$

$$fcp.y = fep.y + n_2.y * l_f * CS;$$

wherein fep.x and fep.y are Cartesian coordinates of the final endpoint, $n_2.x$ is a x component and $n_2.y$ is a y component of the endpoint normal vector n2 associated with the final endpoint; and $l_f$ is the final distance.

7. The method of claim 1, further comprising:
outputting the curved connector that includes the first curve and the second curve to a display device;
receiving input effective to designate on the curved connector displayed on the display device a new intermediate point to include as one of the intermediate points included in the plurality of designated points;
receiving input effective to move the new intermediate point from a first location on the display device to a different location on the display device;
inferring new first and second control points for the new intermediate point at the different location without receiving input effective to directly specify the new first and second control points;
calculating new curves to include in the curved connector between:
the new intermediate point and a corresponding preceding one of the plurality of designated points based at least on the new first control point; and
the new intermediate point and a corresponding subsequent one of the plurality of designated points based at least on the new second control point; and
updating the curved connector on the display device by outputting at least the new curves to the display device as part of the curved connector.

8. The method of claim 1, wherein a number of the plurality of designated points of the curved connector is N, the method further comprising:
calculating N−1 curves that include the first curve and the second curve, including calculating a curve between each adjacent pair of designated points included in the plurality of designated points based on two control points inferred for each curve, wherein the two control points inferred for each curve include one control point inferred for each designated point included in each adjacent pair of designated points; and
outputting the curved connector that includes the N−1 curves to a display device.

9. A method to generate a curved connector that passes through a plurality of designated points in a diagram, the method comprising:
receiving input effective to designate the plurality of designated points of the curved connector, the plurality of designated points including an initial endpoint, a final endpoint, and intermediate points between the initial endpoint and the final endpoint;
inferring, for each of the one or more intermediate points, a first control point and a second control point without receiving input effective to directly specify the first control point or the second control point; and
calculating:
a first curve to include in the curved connector between a corresponding one of the one or more intermediate points and a preceding one of the plurality of designated points based at least on the first control point; and
a second curve to include in the curved connector between the corresponding one of the one or more intermediate points and a subsequent one of the plurality of designated points based at least on the second control point;
wherein:
inferring the first control point includes calculating a first distance between the corresponding one of the one or more intermediate points and the preceding one of the plurality of designated points;
inferring the second control point includes calculating a second distance between the corresponding one of the one or more intermediate points and the subsequent one of the plurality of designated points;
inferring the first control point further includes calculating a first force $F_1$ according to $F_1 = [l_1/(l_1 + l_2)] * CS$ where $l_1$ is the first distance, $l_2$ is the second distance, and CS is a constant; and
inferring the second control point further includes calculating a second force $F_2$ according to $F_2 = [l_2/(l_1 + l_2)] * CS$.

10. The method of claim 9, wherein:
inferring the first control point further includes calculating Cartesian coordinates cp1.x and cp1.y of the first control point according to:

$$cp1.x = p1.x - F_1 * (p2.x - p0.x); \text{ and}$$

$$cp1.y = p1.y - F_1 * (p2.y - p0.y); \text{ and}$$

inferring the second control point further includes calculating Cartesian coordinates cp2.x and cp2.y of the second control point according to:

$$cp2.x = p1.x + F_2 * (p2.x - p0.x); \text{ and}$$

$$cp2.y = p1.y + F_2 * (p2.y - p0.y);$$

wherein p1.x and p1.y are Cartesian coordinates of the corresponding one of the intermediate points, p0.x and p0.y are Cartesian coordinates of the preceding one of the plurality of designated points; and p2.x and p2.y are Cartesian coordinates of the subsequent one of the plurality of designated points.

11. A non-transitory computer-readable medium having computer-executable instructions stored thereon that are executable by a processor device to perform or control performance of operations comprising:
  receiving input effective to designate a plurality of designated points of a curved connector, the plurality of designated points including an initial endpoint, a final endpoint, and intermediate points between the initial endpoint and the final endpoint, each of the intermediate points directly designated by user input and included in the curved connector, wherein the intermediate points designated by the user input remain as designated points through which the curved connector passes responsive to further user input that changes the curved connector;
  inferring, for each of the intermediate points, a first control point and a second control point without receiving user input effective to directly specify the first control point or the second control point;
  calculating:
    a first curve to include in the curved connector between a corresponding one of the intermediate points and a preceding one of the plurality of designated points based at least on the first control point; and
    a second curve to include in the curved connector between the corresponding one of the intermediate points and a subsequent one of the plurality of designated points based at least on the second control point;
  receiving user input effective to move a given one of the intermediate points of the curved connector from a first location on the display device to a different location on the display device;
  inferring a new first control point and a new second control point for at least one of the plurality of designated points that is adjacent to the given one of the intermediate points; and
  updating the curved connector on the display device by outputting a plurality of new curves as part of the curved connector, the plurality of new curves determined based on all of the new first control points and all of the new second control points, wherein the curved connector passes through all of the intermediate points.

12. The non-transitory computer-readable medium of claim 11, wherein:
  inferring the first control point includes calculating a first distance between the corresponding one of the intermediate points and the preceding one of the plurality of designated points; and
  inferring the second control point includes calculating a second distance between the corresponding one of the intermediate points and the subsequent one of the plurality of designated points.

13. The non-transitory computer-readable medium of claim 11, wherein:
  calculating the first curve includes calculating a first cubic Bezier curve based on the corresponding one of the intermediate points, the preceding one of the plurality of designated points, the first control point, and a control point associated with the preceding one of the plurality of designated points; and
  calculating the second curve includes calculating a second cubic Bezier curve based on the corresponding one of the intermediate points, the subsequent one of the plurality of designated points, the second control point, and a control point associated with the subsequent one of the plurality of designated points.

14. The non-transitory computer-readable medium of claim 11, the operations further comprising:
  inferring, for the initial endpoint, an initial control point without receiving input effective to directly specify the initial control point, wherein a shape of an initial curve between the initial endpoint and a subsequent one of the intermediate points depends on the initial control point; and
  inferring, for the final endpoint, a final control point without receiving input effective to directly specify the final control point, wherein a shape of a final curve between the final endpoint and a preceding one of the intermediate points depends on the final control point.

15. The non-transitory computer-readable medium of claim 14, wherein:
  inferring the initial control point includes:
    calculating an initial distance between the initial endpoint and the subsequent one of the intermediate points; and
    determining an endpoint normal vector $n_1$ associated with the initial endpoint; and
  inferring the final control point includes:
    calculating a final distance between the final endpoint and the preceding one of the intermediate points; and
    determining an endpoint normal vector $n_2$ associated with the final endpoint.

16. The non-transitory computer-readable medium of claim 15, wherein:
  inferring the initial control point further includes calculating Cartesian coordinates icp.x and icp.y of the initial control point according to:

$$icp.x = iep.x + n_1.x * l_i * CS; \text{ and}$$

$$icp.y = iep.y + n_1.y * l_i * CS;$$

wherein iep.x and iep.y are Cartesian coordinates of the initial endpoint, $n_1$.x is a x component and $n_1$.y is a y component of the endpoint normal vector $n_1$ associated with the initial endpoint, $l_i$ is the initial distance, and CS is a constant; and
  inferring the final control point further includes calculating Cartesian coordinates fcp.x and fcp.y of the final control point according to:

$$fcp.x = fep.x + n_2.x * l_f * CS; \text{ and}$$

$$fcp.y = fep.y + n_2.y * l_f * CS;$$

wherein fep.x and fep.y are Cartesian coordinates of the final endpoint, $n_2$.x is a x component and $n_2$.y is a y component of the endpoint normal vector n2 associated with the final endpoint; and $l_f$ is the final distance.

17. The non-transitory computer-readable medium of claim 11, the operations further comprising:

outputting the curved connector that includes the first curve and the second curve to a display device;

receiving input effective to designate on the curved connector displayed on the display device a new intermediate point to include as one of the intermediate points included in the plurality of designated points;

receiving input effective to move the new intermediate point from a first location on the display device to a different location on the display device;

inferring new first and second control points for the new intermediate point at the different location without receiving input effective to directly specify the new first and second control points;

calculating new curves to include in the curved connector between:
- the new intermediate point and a corresponding preceding one of the plurality of designated points based at least on the new first control point; and
- the new intermediate point and a corresponding subsequent one of the plurality of designated points based at least on the new second control point; and updating the curved connector on the display device by outputting at least the new curves to the display device as part of the curved connector.

18. The non-transitory computer-readable medium of claim 11, wherein a number of the plurality of designated points of the curved connector is N, the operations further comprising:

calculating N−1 curves that include the first curve and the second curve, including calculating a curve between each adjacent pair of designated points included in the plurality of designated points based on two control points inferred for each curve, wherein the two control points inferred for each curve include one control point inferred for each designated point included in each adjacent pair of designated points; and outputting the curved connector that includes the N−1 curves to a display device.

19. A non-transitory computer-readable medium having computer executable instructions stored thereon that are executable by a processor device to perform or control performance of operations comprising:

receiving input effective to designate a plurality of designated points of the curved connector, the plurality of designated points including an initial endpoint, a final endpoint, and one or more intermediate points between the initial endpoint and the final endpoint;

inferring, for each of the one or more intermediate points, a first control point and a second control point without receiving input effective to directly specify the first control point or the second control point; and calculating:
- a first curve to include in the curved connector between a corresponding one of the one or more intermediate points and a preceding one of the plurality of designated points based at least on the first control point; and
- a second curve to include in the curved connector between the corresponding one of the intermediate points and a subsequent one of the plurality of designated points based at least on the second control point;

wherein:
- inferring the first control point includes calculating a first distance between the corresponding one of the one or more intermediate points and the preceding one of the plurality of designated points;
- inferring the second control point includes calculating a second distance between the corresponding one of the one or more intermediate points and the subsequent one of the plurality of designated points;
- inferring the first control point further includes calculating a first force $F_1$ according to $F_1=[l_1/(l_1+l_2)]*CS$ where $l_1$ is the first distance, $l_2$ is the second distance, and CS is a constant; and
- inferring the second control point further includes calculating a second force $F_2$ according to $F_2=[l_2/(l_1+l_2)]*CS$.

20. The non-transitory computer-readable medium of claim 19, wherein:

inferring the first control point further includes calculating Cartesian coordinates cp1.x and cp1.y of the first control point according to:

$cp1.x=p1.x-F_1*(p2.x-p0.x)$; and $cp1.y=p1.y-F_1*(p2.y-p0.y)$; and inferring the second control point further includes calculating Cartesian coordinates cp2.x and cp2.y of the second control point according to:

$cp2.x=p1.x+F_2*(p2.x-p0.x)$; and $cp2.y=p1.y+F_2*(p2.y-p0.y)$;

wherein p1.x and p1.y are Cartesian coordinates of the corresponding one of the intermediate points, p0.x and p0.y are Cartesian coordinates of the preceding one of the plurality of designated points; and p2.x and p2.y are Cartesian coordinates of the subsequent one of the plurality of designated points.

* * * * *